US011809222B1

(12) United States Patent
 Davies et al.

(10) Patent No.: US 11,809,222 B1
(45) Date of Patent: *Nov. 7, 2023

(54) SYSTEMS AND METHODS TO GENERATE UNITS OF WORK WITHIN A COLLABORATION ENVIRONMENT BASED ON SELECTION OF TEXT

(71) Applicant: ASANA, INC., San Francisco, CA (US)

(72) Inventors: Rodrigo Davies, San Francisco, CA (US); Yujian Yao, San Francisco, CA (US); Micah Bennett-Cauchon, Brooklyn, NY (US)

(73) Assignee: Asana, Inc., San Francisco, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 17/329,096

(22) Filed: May 24, 2021

(51) Int. Cl.
  *G06F 16/176* (2019.01)
  *H04L 65/401* (2022.01)
  *H04L 67/306* (2022.01)
  *G06F 40/134* (2020.01)
  *H04L 67/104* (2022.01)
  *G06F 40/166* (2020.01)

(52) U.S. Cl.
  CPC .......... *G06F 16/176* (2019.01); *G06F 40/134* (2020.01); *G06F 40/166* (2020.01); *H04L 65/4015* (2013.01); *H04L 67/1044* (2013.01); *H04L 67/306* (2013.01)

(58) Field of Classification Search
  None
  See application file for complete search history.

(56) References Cited

U.S. PATENT DOCUMENTS

| | | | |
|---|---|---|---|
| 5,233,687 | A | 8/1993 | Henderson, Jr. |
| 5,524,077 | A | 6/1996 | Faaland |
| 5,530,861 | A | 6/1996 | Diamant |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS (Tiburca, Andrew) Best Team Calendar Applications for 2018—Toggl https://toggl.com/blog/best-team-calendar-applications-for-2018 (Year: 2017).

(Continued)

*Primary Examiner* — Thu N Nguyen
(74) *Attorney, Agent, or Firm* — ESPLIN & ASSOCIATES, PC

(57) ABSTRACT

Systems and methods to link generate units of work within a collaboration environment are described herein. Exemplary implementations may: manage environment state information maintaining a collaboration environment; effectuate presentation of a user interface of the collaboration environment; obtain input information conveying user input into the user interface including selection of text; obtain content information characterizing content of text selected within the individual view of the collaboration environment; generate individual units of work based on the content information by storing the work information describing the individual units of work as part of the environment state information; and/or perform other operations.

20 Claims, 4 Drawing Sheets

(56) References Cited

U.S. PATENT DOCUMENTS

| | | | |
|---|---|---|---|
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |
| 6,769,013 | B2 | 7/2004 | Frees |
| 6,859,523 | B1 | 2/2005 | Jilk |
| 7,020,697 | B1 | 3/2006 | Goodman |
| 7,039,596 | B1 | 5/2006 | Lu |
| 7,086,062 | B1 | 8/2006 | Faour |
| 7,349,920 | B1 | 3/2008 | Feinberg |
| 7,418,482 | B1 | 8/2008 | Lusher |
| 7,428,723 | B2 | 9/2008 | Greene |
| 7,640,511 | B1 | 12/2009 | Keel |
| 7,676,542 | B2 | 3/2010 | Moser |
| 7,779,039 | B2 | 8/2010 | Weissman |
| 7,805,327 | B1 | 9/2010 | Schulz |
| RE41,848 | E | 10/2010 | Daniell |
| 7,844,454 | B2 | 11/2010 | Coles |
| 7,917,855 | B1 | 3/2011 | Satish |
| 7,996,744 | B2 | 8/2011 | Ojala |
| 7,996,774 | B1 | 8/2011 | Sidenur |
| 8,214,747 | B1 | 7/2012 | Yankovich |
| 8,314,809 | B1 | 11/2012 | Grabowski |
| 8,499,300 | B2 | 7/2013 | Zimberg |
| 8,522,240 | B1 | 8/2013 | Merwarth |
| 8,527,287 | B1 | 9/2013 | Bhatia |
| 8,554,832 | B1 | 10/2013 | Moskovitz |
| 8,572,477 | B1 | 10/2013 | Moskovitz |
| 8,627,199 | B1 | 1/2014 | Handley |
| 8,639,552 | B1 | 1/2014 | Chen |
| 8,768,751 | B2 | 7/2014 | Jakowski |
| 8,831,879 | B2 | 9/2014 | Stamm |
| 8,843,832 | B2 | 9/2014 | Frields |
| 8,863,021 | B1 | 10/2014 | Bee |
| 9,009,096 | B2 | 4/2015 | Pinckney |
| 9,024,752 | B2 | 5/2015 | Tumayan |
| 9,143,839 | B2 | 9/2015 | Reisman |
| 9,152,668 | B1 | 10/2015 | Moskovitz |
| 9,201,952 | B1 | 12/2015 | Chau |
| 9,208,262 | B2 | 12/2015 | Bechtel |
| 9,251,484 | B2 | 2/2016 | Cantor |
| 9,299,039 | B1 | 3/2016 | Wang |
| 9,350,560 | B2 | 5/2016 | Hupfer |
| 9,383,917 | B2 | 7/2016 | Mouton |
| 9,405,532 | B1 | 8/2016 | Sullivan |
| 9,405,810 | B2 | 8/2016 | Smith |
| 9,454,623 | B1 | 9/2016 | Kaptsan |
| 9,514,424 | B2 | 12/2016 | Kleinbart |
| 9,600,136 | B1 | 3/2017 | Yang |
| 9,674,361 | B2 | 6/2017 | Ristock |
| 9,712,576 | B1 | 7/2017 | Gill |
| 9,785,445 | B2 | 10/2017 | Mitsui |
| 9,830,398 | B2 | 11/2017 | Schneider |
| 9,842,312 | B1 | 12/2017 | Rosati |
| 9,949,681 | B2 | 4/2018 | Badenes |
| 9,953,282 | B2 | 4/2018 | Shaouy |
| 9,959,420 | B2 | 5/2018 | Kiang |
| 9,978,040 | B2 | 5/2018 | Lee |
| 9,990,636 | B1 | 6/2018 | Lewis |
| 10,001,911 | B2 | 6/2018 | Breedvelt-Schouten |
| 10,003,693 | B2 | 6/2018 | Wolthuis |
| 10,083,412 | B2 | 9/2018 | Suntinger |
| 10,157,355 | B2 | 12/2018 | Johnson |
| 10,192,181 | B2 | 1/2019 | Katkar |
| 10,235,156 | B2 | 3/2019 | Johnson |
| 10,264,067 | B2 | 4/2019 | Subramani |
| 10,308,992 | B2 | 6/2019 | Chauvin |
| 10,373,084 | B2 | 8/2019 | Kurjanowicz |
| 10,373,090 | B2 | 8/2019 | Holm |
| 10,382,501 | B2 | 8/2019 | Malatesha |
| 10,455,011 | B2 | 10/2019 | Kendall |
| 10,496,943 | B2 | 12/2019 | De |
| 10,594,788 | B2 | 3/2020 | Larabie-Belanger |
| 10,606,859 | B2 | 3/2020 | Smith |
| 10,613,735 | B1 | 4/2020 | Karpe |
| 10,616,151 | B1 | 4/2020 | Cameron |
| 10,623,359 | B1 | 4/2020 | Rosenstein |
| 10,657,501 | B2 | 5/2020 | Choi |
| 10,671,692 | B2 | 6/2020 | Koopman |
| 10,684,870 | B1 | 6/2020 | Sabo |
| 10,706,484 | B1 | 7/2020 | Murnock |
| 10,785,046 | B1 | 9/2020 | Raghavan |
| 10,810,222 | B2 | 10/2020 | Koch |
| 10,846,105 | B2 | 11/2020 | Granot |
| 10,846,297 | B2 | 11/2020 | Smith |
| 10,922,104 | B2 | 2/2021 | Sabo |
| 10,956,845 | B1 | 3/2021 | Sabo |
| 10,970,299 | B2 | 4/2021 | Smith |
| 10,977,434 | B2 | 4/2021 | Pelz |
| 10,983,685 | B2 | 4/2021 | Karpe |
| 11,062,270 | B2 | 7/2021 | Hilleli |
| 11,082,281 | B2 | 8/2021 | Rosenstein |
| 11,095,468 | B1 | 8/2021 | Pandey |
| 11,113,667 | B1 | 9/2021 | Jiang |
| 11,138,021 | B1 | 10/2021 | Rosenstein |
| 11,140,174 | B2 | 10/2021 | Patel |
| 11,170,761 | B2 | 11/2021 | Thomson |
| 11,204,683 | B1 | 12/2021 | Sabo |
| 11,212,242 | B2 | 12/2021 | Cameron |
| 11,263,228 | B2 | 3/2022 | Koch |
| 11,288,081 | B2 | 3/2022 | Sabo |
| 11,290,296 | B2 | 3/2022 | Raghavan |
| 11,327,645 | B2 | 5/2022 | Karpe |
| 11,341,444 | B2 | 5/2022 | Sabo |
| 11,341,445 | B1 | 5/2022 | Cheng |
| 11,449,836 | B1 * | 9/2022 | Clifton ............ G06Q 10/06316 |
| 11,496,711 | B1 | 11/2022 | Cronan |
| 2002/0065798 | A1 | 5/2002 | Bostleman |
| 2002/0082889 | A1 | 6/2002 | Oliver |
| 2002/0143594 | A1 | 10/2002 | Kroeger |
| 2003/0028595 | A1 | 2/2003 | Vogt |
| 2003/0036934 | A1 | 2/2003 | Ouchi |
| 2003/0041317 | A1 | 2/2003 | Sokolov |
| 2003/0065722 | A1 | 4/2003 | Ieperen |
| 2003/0097406 | A1 | 5/2003 | Stafford |
| 2003/0097410 | A1 | 5/2003 | Atkins |
| 2003/0126001 | A1 | 7/2003 | Northcutt |
| 2003/0200223 | A1 | 10/2003 | Hack |
| 2003/0225598 | A1 | 12/2003 | Yu |
| 2003/0233265 | A1 | 12/2003 | Lee |
| 2003/0233268 | A1 | 12/2003 | Taqbeem |
| 2004/0083448 | A1 | 4/2004 | Schulz |
| 2004/0093290 | A1 | 5/2004 | Doss |
| 2004/0093351 | A1 | 5/2004 | Lee |
| 2004/0098291 | A1 | 5/2004 | Newburn |
| 2004/0125150 | A1 | 7/2004 | Adcock |
| 2004/0162833 | A1 | 8/2004 | Jones |
| 2004/0187089 | A1 | 9/2004 | Schulz |
| 2004/0207249 | A1 | 10/2004 | Baumgartner |
| 2004/0230447 | A1 | 11/2004 | Schwerin-Wenzel |
| 2004/0268451 | A1 | 12/2004 | Robbin |
| 2005/0210394 | A1 | 9/2005 | Crandall |
| 2005/0216111 | A1 | 9/2005 | Ooshima |
| 2005/0222971 | A1 | 10/2005 | Cary |
| 2006/0028917 | A1 | 2/2006 | Wigginton |
| 2006/0030992 | A1 | 2/2006 | Iwatsuki |
| 2006/0047454 | A1 | 3/2006 | Tamaki |
| 2006/0085245 | A1 | 4/2006 | Takatsuka |
| 2006/0095859 | A1 | 5/2006 | Bocking |
| 2006/0136441 | A1 | 6/2006 | Fujisaki |
| 2006/0143270 | A1 | 6/2006 | Wodtke |
| 2006/0167736 | A1 | 7/2006 | Weiss |
| 2006/0190391 | A1 | 8/2006 | Cullen, III |
| 2006/0200264 | A1 | 9/2006 | Kodama |
| 2006/0218551 | A1 | 9/2006 | Berstis |
| 2006/0224430 | A1 | 10/2006 | Butt |

(56) References Cited

U.S. PATENT DOCUMENTS

| | | |
|---|---|---|
| 2006/0277487 A1 | 12/2006 | Poulsen |
| 2007/0016465 A1 | 1/2007 | Schaad |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0018835 A1 | 1/2009 | Cooper |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0089225 A1 | 4/2009 | Baier |
| 2009/0089682 A1 | 4/2009 | Baier |
| 2009/0089701 A1 | 4/2009 | Baier |
| 2009/0094623 A1 | 4/2009 | Chakra |
| 2009/0100340 A1 | 4/2009 | Paek |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2010/0332236 A1 | 12/2010 | Tan |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0318447 A1 | 11/2013 | Deluca |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0028826 A1 | 1/2014 | Lee |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |

(56) References Cited

U.S. PATENT DOCUMENTS

| | | |
|---|---|---|
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0149540 A1 | 5/2015 | Barker |
| 2015/0153906 A1 | 6/2015 | Liao |
| 2015/0154291 A1 | 6/2015 | Shepherd |
| 2015/0169069 A1 | 6/2015 | Lo |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | Mcclement |
| 2016/0182311 A1 | 6/2016 | Borna |
| 2016/0188145 A1 | 6/2016 | Vida |
| 2016/0216854 A1 | 7/2016 | Mcclellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0097929 A1 | 4/2017 | Cecchi |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0161258 A1 | 6/2017 | Astigarraga |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2017/0364866 A1 | 12/2017 | Steplyk |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225618 A1 | 8/2018 | Shaouy |
| 2018/0225795 A1 | 8/2018 | Napoli |
| 2018/0247352 A1 | 8/2018 | Rogers |
| 2018/0247648 A1 | 8/2018 | Nadimpalli |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0272902 A1 | 9/2019 | Vozila |
| 2019/0318321 A1 | 10/2019 | Lopez Venegas |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0362252 A1 | 11/2019 | Miller |
| 2019/0370320 A1 | 12/2019 | Kalra |
| 2020/0019907 A1 | 1/2020 | Notani |
| 2020/0059539 A1 | 2/2020 | Wang |
| 2020/0065736 A1 | 2/2020 | Relangi |

(56) References Cited

U.S. PATENT DOCUMENTS

| | | |
|---|---|---|
| 2020/0118568 A1 | 4/2020 | Kudurshian |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2020/0349614 A1 | 11/2020 | Batcha |
| 2021/0004380 A1 | 1/2021 | Koch |
| 2021/0004381 A1 | 1/2021 | Smith |
| 2021/0089860 A1 | 3/2021 | Heere |
| 2021/0097466 A1 | 4/2021 | Sabo |
| 2021/0103451 A1 | 4/2021 | Sabo |
| 2021/0110347 A1 | 4/2021 | Khalil |
| 2021/0117479 A1 | 4/2021 | Liu |
| 2021/0134296 A1 | 5/2021 | Iturbe Desentis |
| 2021/0136012 A1 | 5/2021 | Barbitta |
| 2021/0182475 A1 | 6/2021 | Pelz |
| 2021/0209561 A1 | 7/2021 | Kishore |
| 2021/0216562 A1 | 7/2021 | Smith |
| 2021/0232282 A1 | 7/2021 | Karpe |
| 2021/0287673 A1 | 9/2021 | Kaplan |
| 2021/0320891 A1 | 10/2021 | Rosenstein |
| 2021/0342786 A1 | 11/2021 | Jiang |
| 2021/0365862 A1 | 11/2021 | Doan |
| 2021/0382734 A1 | 12/2021 | Rosenstein |
| 2022/0019320 A1 | 1/2022 | Sabo |
| 2022/0058548 A1 | 2/2022 | Garg |
| 2022/0060345 A1 | 2/2022 | Wiener |
| 2022/0075792 A1 | 3/2022 | Koch |
| 2022/0078142 A1 | 3/2022 | Cameron |
| 2022/0158859 A1 | 5/2022 | Raghavan |
| 2022/0207489 A1 | 6/2022 | Gupta |
| 2022/0377279 A1 | 11/2022 | Cronan |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

Creating Tables with Fields from 2 Different Tables, published: 2009, publisher: StackOverflow, pp. 1-2. (Year: 2009).
"Rules of Data Conversion from Document to Relational Databases", published: 2014, publisher: Future-processing, pp. 1-8 (Year: 2014).
Critical chain project management, Wikipedia, archives org, Dec. 17, 2016 https://web.archive.Org/web/20161217090326/https://en.wikipedia.org/wiki/Critical_chain_project_management (Year: 2016) 5 pages.
Critical Path Method, Wikipedia, archives org, Sep. 19, 2017 https://web.archive.Org/web/20170919223814/https://en.wikipedia.org/wiki/Critical_path_method (Year: 2017) 6 pages.
Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.
Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).
Wix.com, How to Use Wix Code with Marketing Tools to Create Custom Events, Oct. 18, 2018, YouTube, https://www.youtube.com/watch?v=MTBVykOYGvO&feature=emb_title, 2 pages.
www.asana.com (as retrieved from https://web.archive.Org/web/20160101054536/https://asana.com/press and https:// web.archive.org/web/20160101054527/https://asana.com/product) (Year: 2016) 15 pages.
"U.S. Appl. No. 14/584,750, Examiner Interview Summary dated Feb. 25, 2016", 3 pgs.
"U.S. Appl. No. 14/584,750, Non Final Office Action dated Aug. 28, 2015", 21 pgs.
"U.S. Appl. No. 14/584,750, Notice of Allowance dated Mar. 28, 2016", 8 pgs.
"U.S. Appl. No. 14/584,750, Response filed Feb. 29, 2015 to Non Final Office Action dated Aug. 28, 2015", 16 pgs.
"U.S. Appl. No. 14/584,850, Final Office Action dated Sep. 1, 2017", 31 pgs.
"U.S. Appl. No. 14/584,850, Non Final Office Action dated Jan. 10, 2017", 9 pgs.
"U.S. Appl. No. 14/584,850, Response filed Apr. 10, 2017 to Non Final Office Action dated Jan. 10, 2017", 13 pgs.
"How to Asana: Inviting teammates to Asana." YouTube, Asana, Mar. 21, 2017, https://www.youtube.com/watch?v=TLOruY1KyxU ( Year: 2017), 13 pages.
Asana Demo and Product Tour, you tube excerpt, Dec. 7, 2017 https://www.youtube.com/watch?v=IMAFWVLGFyw (Year: 2017) (16 pages).
Asana integrations, Asana tutorial, youtube, excerpt, Nov. 16, 2016 https://www.youtube.com/watch?v=hBiQ7DJNinE (Year: 2016) (21 pages).
Asana Workload and Portfolios, youtube, excerpt, Aug. 1, 2019 https://www.youtube.com/watch?v=7XkNcfFDG6M (Year: 2019) (20 pages).
Asana YouTube channel, list of all product videos, Nov. 19, 2014-Aug. 19, 2019 https://www.youtube.com/user/AsanaTeam/videos?disable_polymer=1 (Year: 2019) (5 pages).
Asana, Task dependencies, archives org, Aug. 25, 2017 https://web.archive.org/web/20170825002141/https://asana.com/guide/help/tasks/dependencies (Year: 2017) (5 pages).
Asana,Manage your team capacity with Workload, youtube, excerpt, Aug. 1, 2019 https://www.youtube.com/watch?v=2ufXyZDzZnA&list=PLJFG93oiowJAi UwyOhIGWHdtJzJrzyIBv (Year: 2019) (1 page).
Biggs, "GateGuru Relaunches With New Ways to Streamline Your Travel Experience", Techcrunch, (Apr. 26, 2013), 3 pgs.
Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).
Command and control, wikipedia, archives org, Mar. 16, 2018 https://web.archive.org/web/20180316193655/https://en.wikipedia.org/wiki/Command_and_control (Year: 2018), 6 pages.
How to Asana Asana time tracking, youtube, excerpt, May 24, 2017 https://www.youtube.com/watch?v=z91qlex-TLc (Year: 2017) (1 page).
How to Asana, Asana project management, youtube, excerpt, Mar. 7, 2017 https://www.youtube.com/watch?v=qqANMTvVpE (Year: 2017) (28 pages).
How to Asana, Creating your first Asana project, youtube, excerpt, Jan. 31, 2017 https://www.youtube.com/watch?v=L04WmcUdsLo (Year: 2017) (1 page).
How to Asana, Getting Asana into your workflow, youtube, excerpt, Jul. 17, 2017 https://www.youtube.com/watch?v=7YLrNMdv3o (Year: 2017) (24 pages).
How to Asana, Planning with Asana calendar, youtube excerpt, Feb. 14, 2017 https://www.youtube.com/watch?v=w8t6KYiVPyc (Year: 2017) (19 pages).
How to Asana, Using Asana for task management, youtube, excerpt, Feb. 7, 2017 https://www.youtube.com/watch?v=vwvbgiejhQ (Year: 2017) (8 pages).
How to Asana, Visualizing work with Asana kanban boards, youtube, excerpt, Feb. 21, 2017 https://www.youtube.com/watch?v=jmZaZGydfPY (Year: 2017) (41 pages).
How to Asana, Workflow management, youtube, excerpt, May 30, 2017 https://www.youtube.com/watch?v=rk8nPWmXsRo (Year: 2017) (9 pages).

(56) References Cited

OTHER PUBLICATIONS

How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRI?d_WM4Bc (Year: 2018) (2 pages).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
Hartmann, "TimeProjectscheduling with resource capacities and requests varying with time: a case study," 2013, Flexible services and manufacturing journal, vol. 25, No. 1, pp. 74-93 (Year: 2013).
Paul Minors, How to automate your tasks, youtube excerpts, Oct. 18, 2019 https://www.youtube.com/watch?v=IwF9XyUQrzw (Year: 2019).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Assef, F., Cassius, T. S., & Maria, T. S. (2018). Confrontation between techniques of time measurement. Journal of Manufacturing Technology Management, 29(5), 789-810. (Year: 2018).
Dawei Li, "Deepcham: Collaborative Edge-Mediated Adaptive Deep Learning for Mobile Object Recognition", 2016, IEEE/ACM, pp. 64-76. (Year: 2016).
Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).
Macro, computer science, wikipedia, archives org Feb. 11, 2020 http://web.archive.org/web/20200211082902/https://en.wikipedia.org/wiki/Macro_(computer_science) (Year: 2020).
Sarikaya, Ruhi. "The technology behind personal digital assistants: An overview of the system architecture and key components." IEEE Signal Processing Magazine 34.1 (2017): 67-81. (Year: 2017).

\* cited by examiner

US 11,809,222 B1

SYSTEMS AND METHODS TO GENERATE UNITS OF WORK WITHIN A COLLABORATION ENVIRONMENT BASED ON SELECTION OF TEXT

FIELD OF THE DISCLOSURE

The present disclosure relates to systems and methods to generate units of work within a collaboration environment based on selection of text.

BACKGROUND

Collaboration environments, sometimes referred to as work management platforms, may enable users to assign projects, tasks, or other assignments to assignees (e.g., other users) to complete. A collaboration environment may comprise an environment in which individual users and/or a virtual team of users does its work and may enable users to work in a more organized and efficient manner.

SUMMARY

One aspect of the present disclosure relates to generating units of work within a collaboration environment based on selection of text. Traditionally, users may manually generate units of work within a collaboration environment. Generating units of work may include manually entering information into a user interface. Manually generating units of work may be time consuming, may decrease workflow efficiency, and the detailed creation of a unit of work may be affected by user error. To address these and/or other problems, one or more implementations presented herein propose a technique to automatically generate units of work based on selection of text and/or other content appearing in a user interface of the collaboration environment. By way of non-limiting illustration, a user may select a portion of text and be prompted with an option to create a unit of work in relation to that text. For example, the selected text may become a title of a unit of work and/or added to a description for a unit of work. In some implementations, when the unit of work is generated, one or more other fields may be automatically filled based on context surrounding the text that was selected. By way of non-limiting illustration, metadata from a source of the unit of work may be used to provide additional context for the unit of work, including automatically setting certain fields for the created unit of work. By way of non-limiting illustration, the user who initially drafted the source text may automatically become the assignee of the new unit of work, the unit of work may become part of a project the source text is associated with, and/or the new unit of work may become a subtask of an existing unit of work including the source text. Further, the new unit of work may automatically include a link to the source text. In some implementations, metadata associated with the text-selecting user may be used to provide additional context for the unit of work, including automatically setting certain fields for the created unit of work. By way of non-limiting illustration, a user of a given role in relation to the text-selecting user may automatically become the assignee of the new unit of work (e.g., project manager selects text, and their intern becomes assignee of a newly generated unit of work).

One or more implementations of a system to generate units of work within a collaboration environment based on selection of text may include one or more hardware processors configured by machine-readable instructions and/or other components. Executing the machine-readable instructions may cause the one or more hardware processors to facilitate generating units of work within a collaboration environment. The machine-readable instructions may include one or more computer program components. The one or more computer program components may include one or more of an environment state component, a user interface component, a selection component, a work creation component, and/or other components.

The environment state component may be configured to manage environment state information maintaining a collaboration environment and/or other information. The collaboration environment may be configured to facilitate interaction by users with the collaboration environment. The environment state information may define one or more records. The one or more records may include one or more of user records, work unit records, project records, and/or other records. The user records may include user information describing the users of the collaboration environment. The work unit records may include work information describing units of work assigned to, created by and/or managed by the users within the collaboration environment. The project records may include project information describing projects assigned to, created by and/or managed within the collaboration environment. In some implementations, individual projects may include individual sets of the units of work supporting the individual projects.

The user interface component may be configured to effectuate presentation of the collaboration environment. The user interface may provide one or more views of the collaboration environment. In some implementations, an individual view of the collaboration environment may textually display one or more of user information of an individual user record, work information of an individual work unit record, project information of an individual project record, and/or other information.

The selection component may be configured to obtain input information and/or other information. The input information may convey user input into the user interface. In some implementations, the user input may include selection of text displayed within an individual view of the collaboration environment.

In some implementations, the selection component may be configured to obtain content information and/or other information. The content information may characterize content of the text selected within the individual view of the collaboration environment. By way of non-limiting illustration, in response to selection of first text displayed within a first view of the collaboration environment, the selection component may be configured to obtain first content information characterizing first content of the first text. In some implementations, the content information characterizing the content of the text may include one or more of words included in the text, phrases included in the text, context information specifying context of the text, and/or other information.

The work creation component may be configured to generate individual units of work based on the content information and/or other information. The individual units of work may be generated by storing work information describing the individual units of work as part of the environment state information. By way of non-limiting illustration, a first unit of work may be generated based on the first content information by storing first work information describing the first unit of work in a first work unit record within the environment state information.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
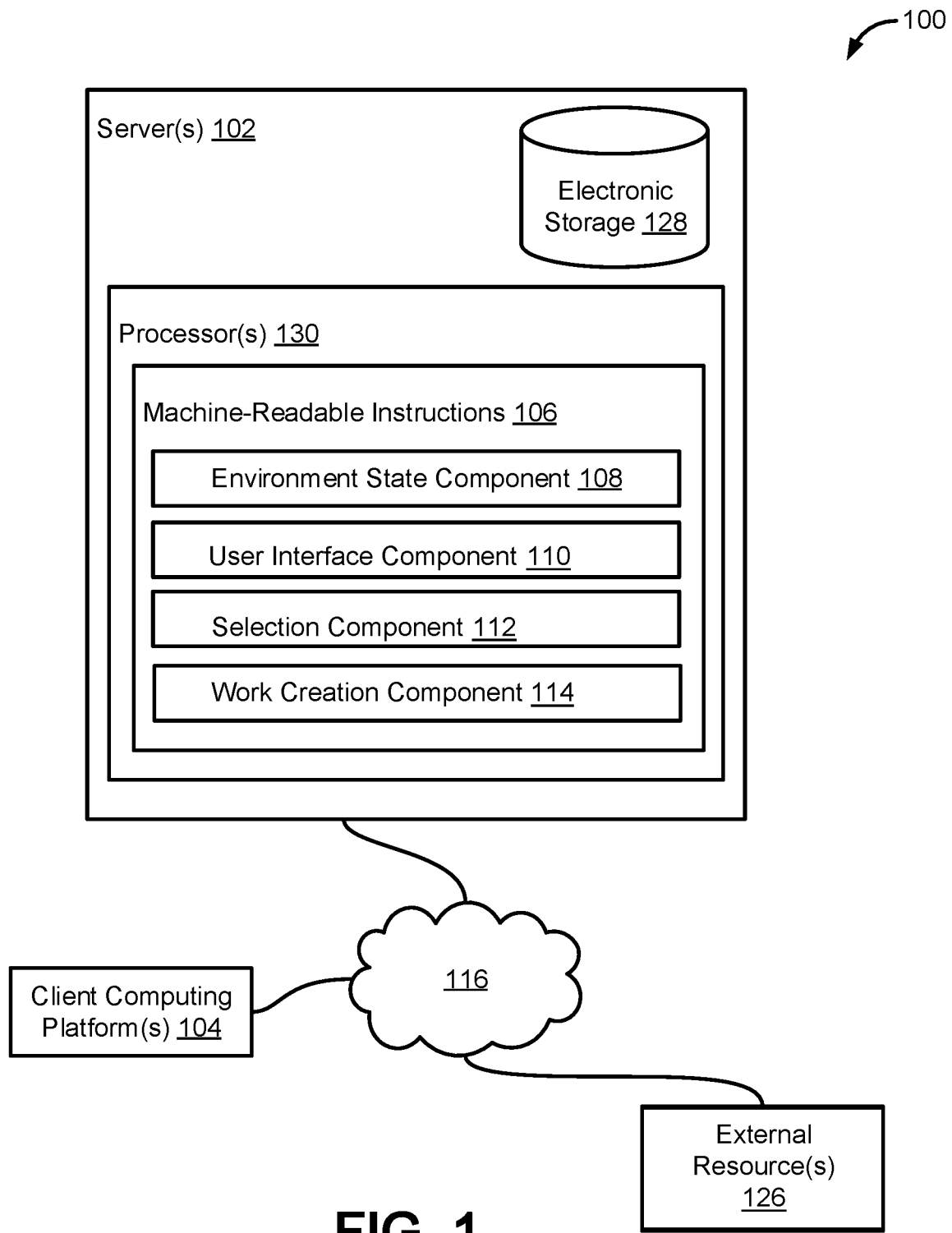
FIG. 1 illustrates a system configured to generate units of work within a collaboration environment based on selection of text, in accordance with one or more implementations.

FIG. 1 illustrates a system 100 configured to generate units of work within a collaboration environment based on selection of text, in accordance with one or more implementations. Manually generating units of work may be time consuming, may decrease workflow efficiency, and the detailed creation of a unit of work may be affected by user error. To address these and/or other problems, one or more implementations presented herein propose a technique to automatically generate units of work based on selection of text and/or other content appearing in a user interface of the collaboration environment. By way of non-limiting illustration, a user may select a portion of text and be prompted with an option to create a unit of work in relation to that text. For example, the selected text may become a title of a unit of work and/or added to a description for a unit of work. Generating units of work in an automated fashion by selecting text may decrease the amount of time needed for generating units of work, in turn improving workflow efficiency. Another added benefit of generating of units of work in an automated fashion may be accuracy in conveying information pertinent to the successful execution of units of work, the quality of work product by users in the collaboration environment may improve.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating units of work within a collaboration environment based on selection of text. The computer program components may include one or more of an environment state component 108, user interface component 110, selection component 112, work creation component 114, and/or other components.

Environment state component 108 may be configured to manage environment state information and/or other information used in maintaining a collaboration environment. The collaboration environment may be configured to facilitate interaction by users with the collaboration environment. The environment state information may include one or more of user records, work unit records, project records, objective records, and/or other records. The user records may include user information describing the users of the collaboration environment. The work unit records which may include work information describing units of work assigned to, created by, and/or managed by the users within the collaboration environment. By way of non-limiting illustration, the work unit records may include a first work unit record including first work information for a first unit of work. The project records may include project information describing projects created, assigned, and/or managed within the collaboration environment. An individual project may include individual sets of the units of work supporting the individual projects. The objective records may include objective information describing business objectives specified within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/ productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, and external resource may include a calendar application which may be external to a collaboration environment. The collaboration environment may have permissions to access the external calendar application to determine and/or obtain schedule information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, dependency parameter, and/or other parameters. The values of the work assignment parameter may describe units of work assigned to the individual users. The values of the work management parameter may describe units of work managed by the individual users. The values of the work creation parameter may describe units of work created by the individual users. In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a first unit of work may not be started until a second unit of work is completing, meaning the first unit of work is dependent on the second unit of work. In some implementations, values of the dependency parameter may go hand in hand with the hierarchical information. By way of non-limiting illustration, a unit of work that is subordinate to an other unit of work may be dependent on the other unit of work, or vice versa.

In some implementations, values of work unit parameters may include one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects created, assigned, and/or managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

In some implementations, activities that impact the progress toward completion of the individual projects may be reflected by changes in the values of one or more of the work unit parameters and/or the values of one or more of the project parameters.

The values of the project parameters may, by way of non-limiting example, include one or more of: one or more units of work within individual ones of the projects (which may include values of work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of work unit records and/or project records that support the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. Meaning, the completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

It is noted that any metadata and/or values of parameters related to any users, projects, business objectives, and/or units of work may be considered values of user parameters, project parameters, objective parameters, and/or work unit parameters.

In some implementations, environment state component 108 may be configured to manage information defining work unit pages corresponding to the individual units of work. Individual work unit pages may provide access to individual units of work. Managing information defining work unit pages may include determining, obtaining, and/or modifying information used to generate work unit pages. Managing information defining individual work unit pages may include providing information to the environment state component 108 to effectuate presentation of the work unit pages, and/or other information. In some implementations, individual work unit pages may include individual sets of interface elements displaying the values of one or more of the work unit parameters of the individual units of work.

In some implementations, environment state component 108 may be configured to manage information defining project pages corresponding to the individual projects. Individual project pages may provide access to individual project. Managing information defining project pages may include determining, obtaining, and/or modifying information used to generate project pages. Managing information defining individual project pages may include providing information to the environment state component 108 to effectuate presentation of the project pages, and/or other information. In some implementations, individual project pages may include individual sets of interface elements displaying the values of one or more of the project parameters of the individual projects.

In some implementations, environment state component 108 may be configured to manage information defining business objective pages corresponding to the individual business objectives. Individual business objective pages may provide access to individual business objectives. Managing information defining business objective pages may include determining, obtaining, and/or modifying information used to generate business objective pages. Managing information defining individual business objective pages may include providing information to the environment state component 108 to effectuate presentation of the business objective pages, and/or other information. In some implementations, individual business objective pages may include individual sets of interface elements displaying the values of one or more of the objective parameters of the individual business objectives.

The user interface component 110 may be configured to effectuate presentation of a user interface of the collaboration environment. The user interface may provide one or more views of the collaboration environment. In some implementations, an individual view of the collaboration environment may textually and/or graphically display information from one or more of a user record, a project record, an objective record, and/or other records. By way of non-limiting illustration, a view may display one or more of a work unit page, a project page, a business objective page, a queue of units of work, and/or other information. In some implementations, textual display of information may include display of a body of text.

The selection component 112 may obtain input information conveying user input into a user interface. In some implementations, the user input may include selection of text displayed within a body of text in an individual view of the collaboration environment. By way of non-limiting illustration, the selection of text may be indicated by the user by highlighting the text, underlining the text, placing the text in brackets, changing the font of the text, and/or other forms of indicating a selection of text by a user.

Selection component 112 may be configured to obtain content information characterizing content of text selected within an individual view of the collaboration environment. By way of non-limiting illustration, in response to selection of first text displayed within a first view of the collaboration environment, obtaining first content information may characterize first content of the first text.

The content information characterizing the content of the text may include one or more of words included in the text, phrases included in the text, context information specifying context of the text, and/or other content. The selection component 112 may use natural language processing techniques and/or other techniques.

In some implementations, content of the text may trigger generate of one or more units of work. By way of non-limiting illustration, the content information that triggers generation of the individual units of work by users may include one or more trigger phrases and/or words. The individual units of work may be generated from selected text based on identifying one or more of the trigger phrases and/or words from the words and/or phrases included in the text. By way of non-limiting illustration, the trigger phrases and/or words may include words and/or phrases conveying action items or tasks to be completed, desires or wants, and/or other information. In some implementations, the trigger phrases and/or words may include words accompanied by one or more of will you, can you, could you, please, by a given date, before the given date, we need, I need, I want, would be grateful if, you could, and/or other phrases and/or words. By way of non-limiting illustration, text may include "The background research to be completed should help us determine the next course of action." An action item determined from this text may include "doing background research." Another action item determined from this text may include "determine next source of action." By way of non-limiting illustration, text may include "When Tom completes the background research, we will know the next course of action." A desire from this text may include "have Tom do the background research." In some implementations, the trigger phrases and/or words may be directly correlated to other projects and/or units of work. By way of non-limiting illustration, the first unit of work may be generated based on identifying a first trigger phrase and/or word included in the first text.

The selection component 112 may be configured to store trigger information. The trigger information may include trigger phrases and/or words, and the corresponding values of work unit parameters that may be generated for one or more units of work. In some implementations, the trigger phrases and/or words may be user-specific and/or system-wide. In some implementations, the trigger phrases and/or words may be set by users and stored within the user records for the users. In some implementations, the selection component 112 may be configured to determine trigger phrases and/or words through one or more machine learning techniques.

In some implementations, the content information characterizing the content of the text may include context information specifying context of the text. The context may include one or more of a source record of the text, a superior record to the source record, a creator of the text, a selector of the text, and/or other information. In some implementations, the individual units of work may be further generated based on the context information. The context information may be used to set individual values of individual work unit parameters.

In some implementations, a creator of the text include user who created a body of text including the selected text. In some implementations, a generated unit of work may include the creator of the text as one or more of an assignee, an assignor, a collaborator, a reviewer, and/or other value of a work unit parameter.

In some implementations, a selector of the text may include a user performing the selection of text within a body of text. In some implementations, a generated unit of work may include the selector of the text as one or more of an assignee, an assignor, a collaborator, a reviewer, and/or other value of a work unit parameter.

In some implementations, a source record of the text may include a record that includes the body of text from which the text was selected. The source record may include one or more of a user record, a work unit record, a project record, an objective record, and/or other records. In some implementations, a generated unit of work may be included in the source record. In some implementations, a generated unit of work may be specified by a work unit record that is subordinate to the source record. In some implementations, a generated unit of work may be specified by a work unit record that is superior to the source record.

In some implementations, a superior record to the source record may include a record specified as superior to the source record based on hierarchical information and/or other information. In some implementations, a generated unit of work may be included in the superior record. In some implementations, a generated unit of work may be specified by a work unit record that is subordinate to the superior record. In some implementations, a generated unit of work may be specified by a work unit record that is superior to the superior record.

The selection component 112 may be configured to identify one or more of the users linked to a body of text. The one or more users linked to the text may include one or more of the creator of the text, the selector of the text, users linked to the source record, users linked to the superior record, and/or other users. The selection component 112 may be configured to obtain the user records for the users linked to a body of text.

By way of non-limiting illustration, the first unit of work may be generated based on first context of the first text. The first context may include one or more of a first source record of the first text, a first superior record to the first source record, a first user who created the first text, a second user who selected the first text, and/or context.

In some implementations, the user interface component 110 may be configured to effectuate presentation of a user interface element in response to the selection of the text. The user interface element may be configured to be selected by the users to cause the generation of individual units of work based on the content information. By way of non-limiting illustration, the user interface element may be presented within a preview window and/or drop-down menu providing the option to generate a unit of work based on the selected text. The user interface element may provide a preview of the potential unit of work including one or more of a title of the potential unit of work, an assignee of the potential unit of work, an assignor of the potential unit of work, a record hierarchy of the potential unit of work, and/or other information. In some implementations, the interface element may include one or more of a text input field, a drop-down menu, a set of check boxes, virtual buttons, and/or other user interface elements that when interacted with, cause an individual unit of work to be generated.

The work creation component 114 may be configured to generate individual units of work based on the content information by storing the work information describing the individual units of work as part of the environment state information. By way of non-limiting illustration, a first unit of work may be generated based on the first content information by storing first work information describing the first unit of work in a first work unit record within the environment state information.

In some implementations, the selection component 112 may be configured whereby selecting text by way of highlighting the text in a certain shade of color may characterize the content of the selected text by way of urgency and/or priority. By way of non-limiting illustration, highlighting the selected text in a shade of green corresponds to generating a unit of work that does not have a pressing timeline. Highlighting the selected text in a shade of red corresponds to generating a unit of work that must be completed as soon as possible (e.g., a due date may be specified day-of, within a predetermined number of days, and/or other specifications).

In some implementations, generating the individual units of work based on the content information may include automatically generating one or more values of one or more work unit parameters of the individual units of work.

By way of non-limiting illustration, generating the first unit of work may include automatically generating a first value of a first work unit parameter of the first unit of work. The first work unit parameter may include a title parameter and the first value may include the first text. In some implementations, a title of the first unit of work may be the first text and/or a portion of the first text. Generating the first unit of work may include automatically generating a second value of a second work unit parameter of the first unit of work. The second work unit parameter may include an assignee parameter. The second value may include the first user who created the first text or the second user who selected the first text. By way of non-limiting illustration, an assignee of the first unit of work may include either the first user or the second user. Generating the first unit of work may include automatically generating a third value of a third work unit parameter of the first unit of work. The third work unit parameter may include a dependency parameter. The third value may include the first source record of the first text. In some implementations, the first source record may include a second work unit record of a second unit of work. By way of non-limiting illustration, the first unit of work is dependent on the second unit of work. Generating the first unit of work may include automatically generating a fourth value of a fourth work unit parameter of the first unit of work. In some implementations, the fourth work unit parameter may include a project inclusion parameter. The fourth value may include the first superior record to the first source record. The first superior record may include a first project record of a first project. By way of non-limiting illustration, the first unit of work may be included in the first project.

In some implementations, the environment state component 108 may be configured to, in response to the generating units of work within a collaboration environment based on selection of text, generate and/or store resource information in individual work unit records of the individual units of work and/or individual project records of the individual projects. The resource information may include one or more of resource identifiers that facilitate access to individual records. A resource identifier may include one or more of a pointer, a hyperlink, and/or other identifier configured to provide access to an individual record (e.g., a source record and/or other record).

Storing the resource information in the individual work unit records of the individual units of work may cause individual resource identifiers to be presented in the individual work unit pages. Storing the resource information in the individual project records of the individual projects may cause individual resource identifiers to be presented in the individual project pages. By way of non-limiting illustration, in response to the first request, first resource information may be stored in the first work unit record. The first resource information may include a first resource identifier. The first resource identifier may be presented in the first work unit page.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

Figure 3:
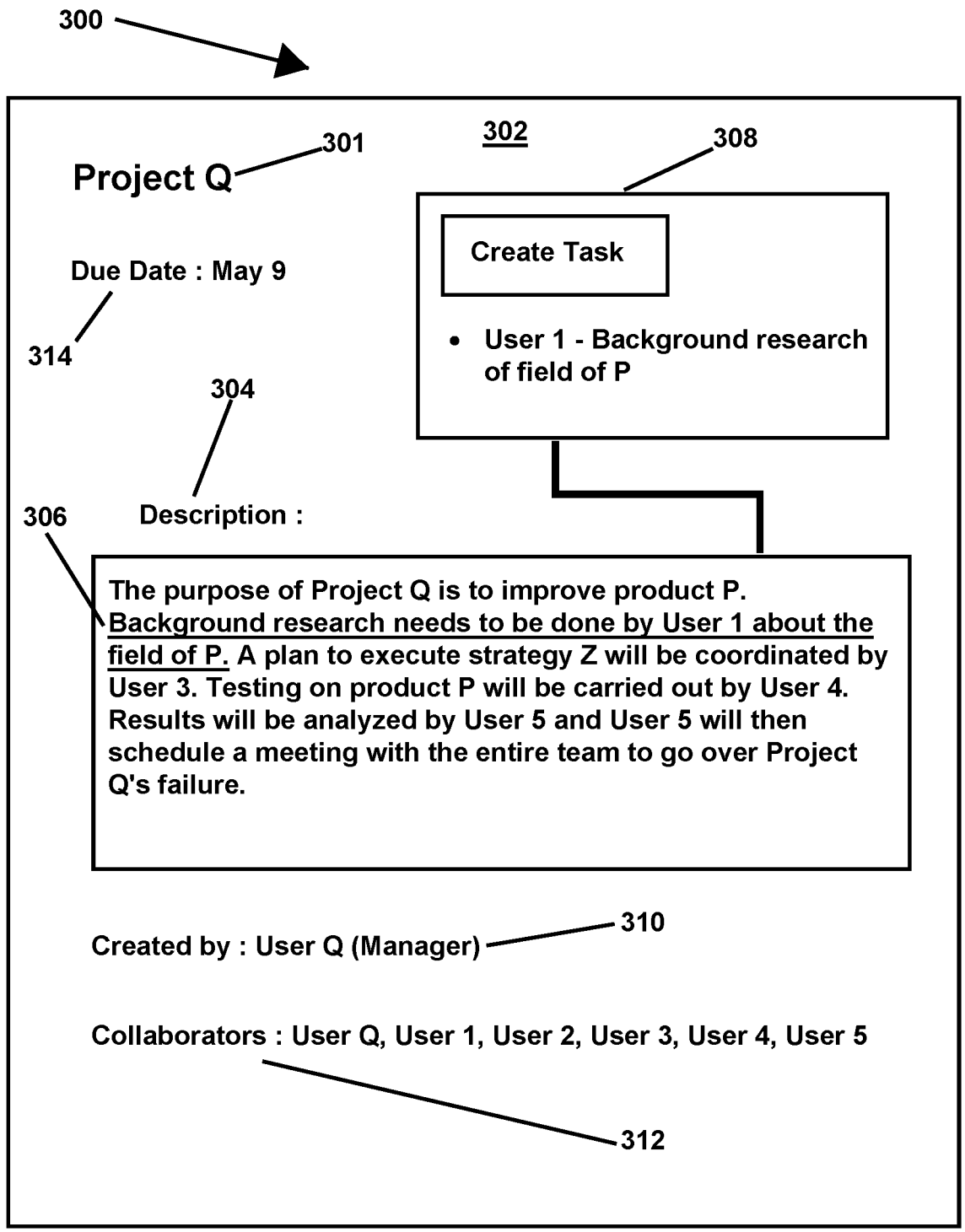
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a project page 302 for a project 301. The user interface 300 may display different values of one or more project parameters of the project, and/or other information. By way of non-limiting illustration, a user interface element 301 may display a title of the first project (e.g., Project Q). A user interface element 304 may correspond to a description parameter, presenting a description of the project 301. The description may include a body of text. A user interface element 310 may identify a creator of the body of text. A user interface element 312 may correspond to the other users linked to the project 301. A user interface element 312 may correspond to the expected date of completion of project Q. User interface element 306 may correspond to a first selected text from the body of text, providing content for generating a first unit of work. A user interface element 308 may correspond to a preview of a unit of work that may be generated by the user by selecting the "create task" virtual button.

Figure 4:
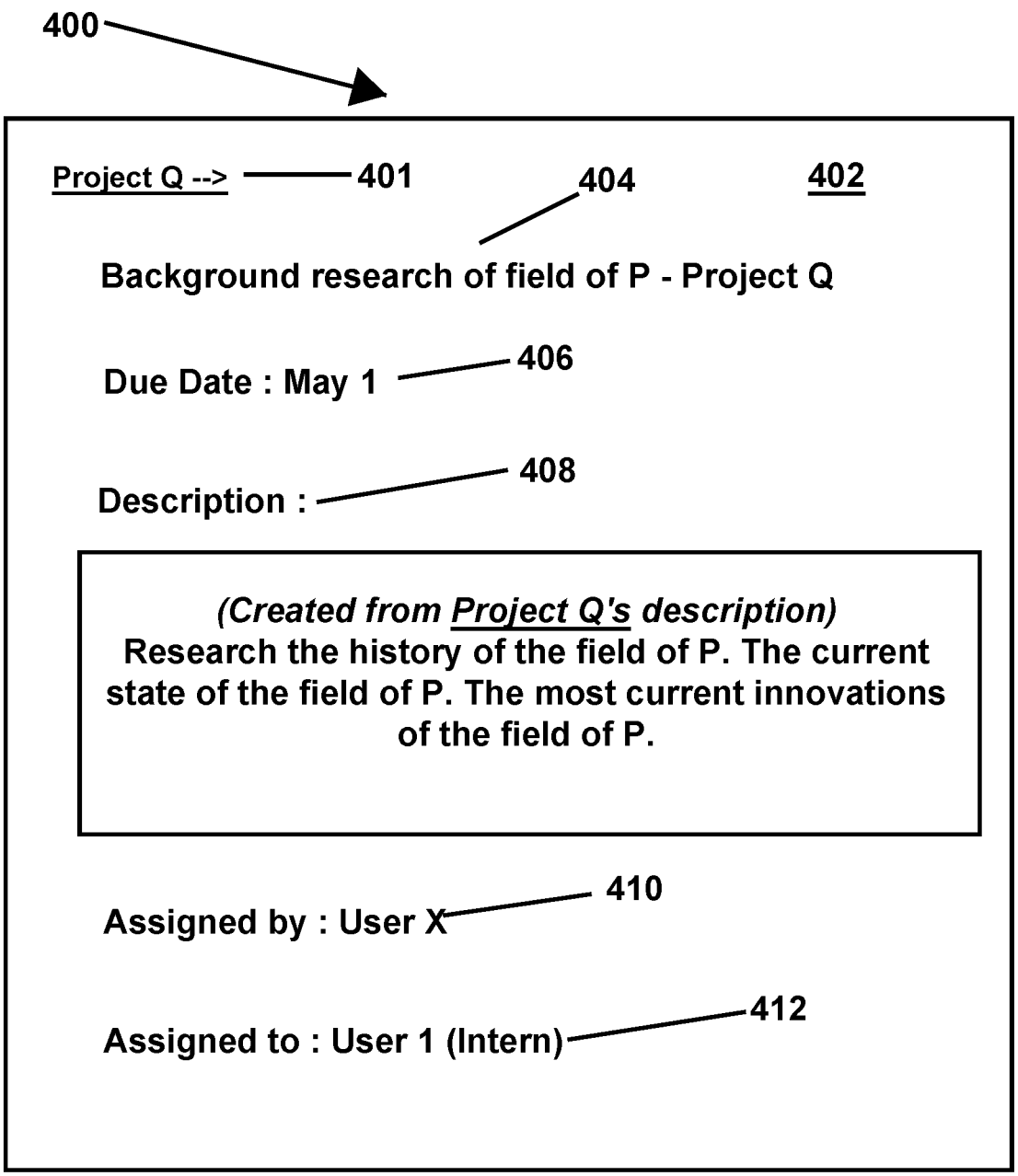
FIG. 4 illustrates a user interface, in accordance with one or more implementations.

FIG. 4 illustrates a user interface 400, in accordance with one or more implementations. The user interface 400 may display a work unit page 402 for a unit of work generated from the first selected text 306 from project 301 of FIG. 3. In FIG. 4, user interface element 401 may correspond to a link to the source record which contains the first selected text 306 (e.g., project record of project Q). The user interface element 404 may correspond to the title of the unit of work, which may include the selected text and/or a portion thereof. The user interface element 406 may correspond to the expected date of completion of the unit of work. The user interface element 408 may correspond to a description of the unit of work. The user interface element 410 may correspond to the assignor of the unit of work, which may comprise the selector of the first selected text from FIG. 3 (shown as User X). The user interface element 412 may correspond to an assignee of the unit of work, which may comprise a user linked to the project, or in this example, a user specifically mentioned in the first selected text.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
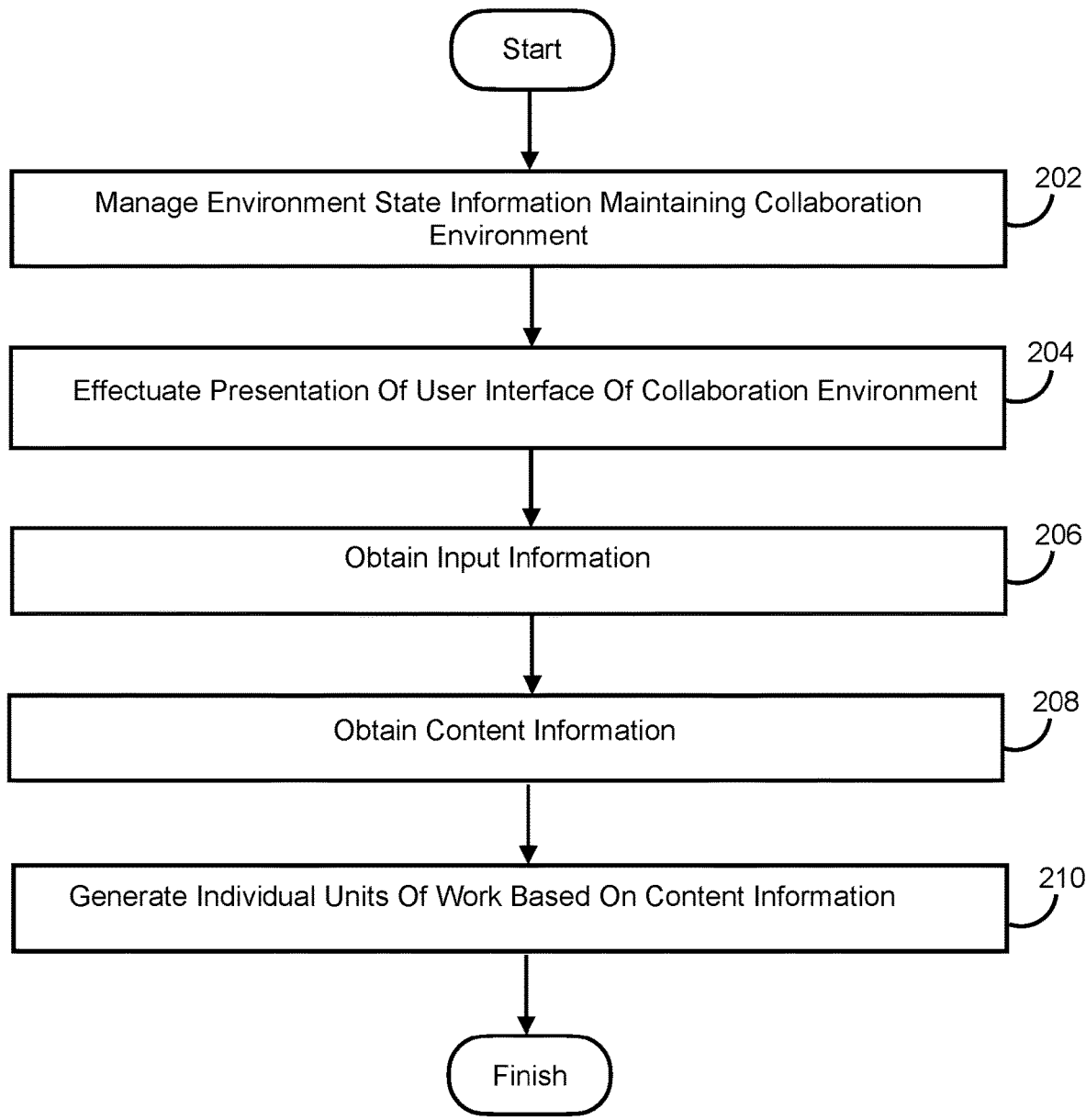
FIG. 2 illustrates a method to generate units of work within a collaboration environment based in selection of text, in accordance with one or more implementations.

FIG. 2 illustrates a method 200 to generate units of work within a collaboration environment based on selection of text, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may include user records, work unit records, project records, and/or other records. The user records may include user information describing the users of the collaboration environment. The work unit records may include values of work information describing units of work assigned to, created by, and/or managed by the users within the collaboration environment. The project records may include project information describing projects managed within the collaboration environment. The individual projects may include individual sets of the units of work supporting the individual projects. Operation 202 may be performed by one or more hardware processors configured by machine-readable instructions including a component that is the same as or similar to environment state component 108, in accordance with one or more implementations.

An operation 204 may effectuate presentation of a user interface of the collaboration environment. The user interface may provide one or more views of the collaboration environment. An individual view of the collaboration environment may textually and/or graphically display one or more of the user information of an individual user record, the work information of an individual work unit record, or the project information of an individual project record. Operation 204 may be performed by one or more hardware processors configured by machine-readable instructions including a component that is the same as or similar to user interface component 110, in accordance with one or more implementations.

An operation 206 may obtain input information conveying user input into the user interface. The user input may include selection of text displayed within the individual view of the collaboration environment. Operation 206 may be performed by one or more hardware processors configured by machine-readable instructions including a component that is the same as or similar to selection component 112, in accordance with one or more implementations.

An operation 208 may obtain content information characterizing content of the text selected within the individual view of the collaboration environment. By way of non-limiting illustration, in response to selection of the first text displayed within a first view of the collaboration environment, first content information characterizing first content of the first text may be obtained. Operation 208 may be performed by one or more hardware processors configured by machine-readable instructions including a component that is the same as or similar to selection component 112, in accordance with one or more implementations.

An operation 210 may generate individual units of work based on the content information by storing the work information describing the individual units of work as part of the environment state information. By way of non-limiting illustration, a first unit of work may be generated based on the first content information by storing first work information describing the first unit of work in a first work unit record within the environment state information. Operation 210 may be performed by one or more hardware processors configured by machine-readable instructions including a component that is the same as or similar to work creation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate units of work within a collaboration environment based on selection of text, the system comprising:
   one or more physical processors configured by machine-readable instructions to:
   manage environment state information maintaining a collaboration environment, the collaboration environment being configured to facilitate interaction by users with the collaboration environment, the environment state information including user records, work units records, and project records, the user records including user information describing the users of the collaboration environment, the work unit records including work information describing units of work assigned to, created by, and/or managed by the users within the collaboration environment, and the project records including project information describing projects managed within the collaboration environment, wherein individual projects include individual sets of the units of work supporting the individual projects;
   effectuate presentation of a user interface of the collaboration environment, the user interface providing one or more views of the collaboration environment, wherein an individual view of the collaboration environment textually displays one or more of the user information of an individual user record, the work information of an individual work unit record, or the project information of an individual project record;
   obtain input information conveying user input into the user interface, wherein the user input includes selection of text displayed within the individual view of the collaboration environment;
   obtain content information characterizing content of the text selected within the individual view of the collaboration environment, such that in response to selection of first text displayed within a first view of the collaboration environment, obtain first content information characterizing first content of the first text; and
   generate individual units of work based on the content information by storing the work information describing the individual units of work as part of the environment state information, such that a first unit of work is generated based on the first content information by storing first work information describing the first unit of work in a first work unit record within the environment state information.

2. The system of claim 1, wherein the one or more physical processors are further configured by the machine-readable instructions to:
   effectuate presentation of a user interface element in response to the selection of the text, wherein the user interface element is configured to be selected by the users to cause the generation of the individual units of work based on the content information.

3. The system of claim 1, wherein the content information characterizing the content of the text includes words and/or phrases included in the text.

4. The system of claim 3, wherein the content information that triggers generation of the individual units of work includes one or more trigger phrases and/or words, such that the individual units of work are generated based on identifying one or more of the trigger phrases and/or words from the words and/or phrases included in the text, such that the first unit of work is generated based on identifying a first trigger phrase and/or word included in the first text.

5. The system of claim 1, wherein the content information characterizing the content of the text includes context information specifying context of the text, the context including one or more of a source record of the text, a superior record to the source record, a creator of the text, or a selector of the text, wherein the individual units of work are further generated based on the context information, such that:
   the first unit of work is generated based on first context of the first text, the first context including one or more of a first source record of the first text, a first superior record to the first source record, a first user who created the first text, or a second user who selected the first text, wherein the first source record includes an individual one of the user records, the work unit records, or the project records.

6. The system of claim 5, wherein the one or more physical processors are further configured by the machine-readable instructions to:
identify one or more of the users linked to the text, the one or more users linked to the text including the creator of the text and the selector of the text;
obtain the user records for the one or more of the users; and
generate the individual units of work based on the user records for the one or more of the users.

7. The system of claim 5, wherein generating the individual units of work based on the content information includes automatically generating one or more values of one or more work unit parameters of the individual units of work, such that generating the first unit of work includes automatically generating a first value of a first work unit parameter of the first unit of work, wherein the first work unit parameter includes a title parameter, and the first value includes the first text such that a title of the first unit of work is the first text.

8. The system of claim 7, wherein generating the first unit of work includes automatically generating a second value of a second work unit parameter of the first unit of work, wherein the second work unit parameter includes an assignee parameter, and the second value includes the first user who created the first text or the second user who selected the first text, such that an assignee of the first unit of work includes either the first user or the second user.

9. The system of claim 8, wherein generating the first unit of work includes automatically generating a third value of a third work unit parameter of the first unit of work, wherein the third work unit parameter includes a dependency parameter, wherein the third value includes the first source record of the first text, wherein the first source record includes a second work unit record of a second unit of work, such that the first unit of work is dependent on the second unit of work.

10. The system of claim 9, wherein generating the first unit of work includes automatically generating a fourth value of a fourth work unit parameter of the first unit of work, wherein the fourth work unit parameter includes a project inclusion parameter, and the fourth value includes the first superior record to the first source record, the first superior record including a first project record of a first project, such that the first unit of work is included in the first project.

11. A method to generate units of work within a collaboration environment based on selection of text, the method comprising:
managing environment state information maintaining a collaboration environment, the collaboration environment being configured to facilitate interaction by users with the collaboration environment, the environment state information including user records, work units records, and project records, the user records including user information describing the users of the collaboration environment, the work unit records including work information describing units of work assigned to, created by, and/or managed by the users within the collaboration environment, and the project records including project information describing projects managed within the collaboration environment, wherein individual projects include individual sets of the units of work supporting the individual projects;
effectuating presentation of a user interface of the collaboration environment, the user interface providing one or more views of the collaboration environment, wherein an individual view of the collaboration environment textually displays one or more of the user information of an individual user record, the work information of an individual work unit record, or the project information of an individual project record;
obtaining input information conveying user input into the user interface, wherein the user input includes selection of text displayed within the individual view of the collaboration environment;
obtaining content information characterizing content of the text selected within the individual view of the collaboration environment, including in response to selection of first text displayed within a first view of the collaboration environment, obtaining first content information characterizing first content of the first text; and
generating individual units of work based on the content information by storing the work information describing the individual units of work as part of the environment state information, including generating a first unit of work based on the first content information by storing first work information describing the first unit of work in a first work unit record within the environment state information.

12. The method of claim 11, further comprising:
effectuating presentation of a user interface element in response to the selection of the text, wherein the user interface element is configured to be selected by the users to cause the generation of the individual units of work based on the content information.

13. The method of claim 11, wherein the content information characterizing the content of the text includes words and/or phrases included in the text.

14. The method of claim 13, wherein the content information that triggers generation of the individual units of work includes one or more trigger phrases and/or words, such that the individual units of work are generated based on identifying one or more of the trigger phrases and/or words from the words and/or phrases included in the text, such that the first unit of work is generated based on identifying a first trigger phrase and/or word included in the first text.

15. The method of claim 11, wherein the content information characterizing the content of the text includes context information specifying context of the text, the context including one or more of a source record of the text, a superior record to the source record, a creator of the text, or a selector of the text, wherein the individual units of work are further generated based on the context information, such that:
the first unit of work is generated based on first context of the first text, the first context including one or more of a first source record of the first text, a first superior record to the first source record, a first user who created the first text, or a second user who selected the first text, wherein the first source record includes an individual one of the user records, the work unit records, or the project records.

16. The method of claim 15, further comprising:
identifying one or more of the users linked to the text, the one or more users linked to the text including the creator of the text and the selector of the text;

obtaining the user records for the one or more of the users; and generating the individual units of work based on the user records for the one or more of the users.

17. The method of claim 15, wherein generating the individual units of work based on the content information includes automatically generating one or more values of one or more work unit parameters of the individual units of work, including generating the first unit of work includes automatically generating a first value of a first work unit parameter of the first unit of work, wherein the first work unit parameter includes a title parameter, and the first value includes the first text such that a title of the first unit of work is the first text.

18. The method of claim 17, wherein generating the first unit of work includes automatically generating a second value of a second work unit parameter of the first unit of work, wherein the second work unit parameter includes an assignee parameter, and the second value includes the first user who created the first text or the second user who selected the first text, such that an assignee of the first unit of work includes either the first user or the second user.

19. The method of claim 18, wherein generating the first unit of work includes automatically generating a third value of a third work unit parameter of the first unit of work, wherein the third work unit parameter includes a dependency parameter, wherein the third value includes the first source record of the first text, wherein the first source record includes a second work unit record of a second unit of work, such that the first unit of work is dependent on the second unit of work.

20. The method of claim 19, wherein generating the first unit of work includes automatically generating a fourth value of a fourth work unit parameter of the first unit of work, wherein the fourth work unit parameter includes a project inclusion parameter, and the fourth value includes the first superior record to the first source record, the first superior record including a first project record of a first project, such that the first unit of work is included in the first project.

* * * * *